US011327272B2

(12) United States Patent
Sanada

(10) Patent No.: US 11,327,272 B2
(45) Date of Patent: May 10, 2022

(54) MIRROR DRIVING DEVICE OF IMAGING APPARATUS AND METHOD FOR CONTROLLING DRIVING OF MIRROR OF IMAGING APPARATUS

(71) Applicant: Ricoh Company, Ltd., Tokyo (JP)

(72) Inventor: Shinichiroh Sanada, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 176 days.

(21) Appl. No.: 16/796,097

(22) Filed: Feb. 20, 2020

(65) Prior Publication Data

US 2020/0301100 A1    Sep. 24, 2020

(30) Foreign Application Priority Data

Mar. 20, 2019    (JP) .............................. JP2019-052672

(51) Int. Cl.
  *G02B 7/182*    (2021.01)
  *G03B 5/00*    (2021.01)
  *G02B 27/64*    (2006.01)

(52) U.S. Cl.
  CPC ........... *G02B 7/182* (2013.01); *G02B 27/646* (2013.01); *G03B 5/00* (2013.01); *G03B 2205/0007* (2013.01)

(58) Field of Classification Search
  CPC ........ G02B 7/182; G02B 27/646; G03B 5/00; G03B 2205/0007; G03B 2205/0053; G03B 19/12
  USPC .......................................... 396/351–359, 447
  See application file for complete search history.

(56) References Cited

U.S. PATENT DOCUMENTS

| 2009/0208199 A1* | 8/2009 | Chijiiwa ................ G03B 19/12 396/358 |
| 2010/0329658 A1 | 12/2010 | Yamada et al. |
| 2010/0329659 A1 | 12/2010 | Yamada et al. |
| 2010/0329665 A1 | 12/2010 | Yamada et al. |
| 2015/0010297 A1 | 1/2015 | Sanada |
| 2015/0037023 A1 | 2/2015 | Sanada et al. |

(Continued)

FOREIGN PATENT DOCUMENTS

| JP | 9-274250 | 10/1997 |
| JP | 2015-139006 | 7/2015 |
| JP | 2017-191295 | 10/2017 |

*Primary Examiner* — Darryl J Collins
*Assistant Examiner* — Matthew Y Lee
(74) *Attorney, Agent, or Firm* — Xsensus LLP

(57) ABSTRACT

A mirror driving device includes a positioner in the imaging apparatus; a mirror holder configured to hold the movable mirror and move to the first position and the second position of the movable mirror; a positioning surface at the mirror holder and configured to come into contact with the positioner to determine the first position of the movable mirror; and a shock dispersion surface provided at the mirror holder. When moving from the second position toward the first position, the movable mirror is configured to contact the positioner before the positioning surface comes into contact with the positioner to reduce a shock. The shock dispersion surface has a smaller inclination with respect to a travel-direction tangent line than an inclination of the positioning surface with respect to the tangent line. The shock dispersion surface is located forward of the positioning surface in the travel direction toward the first position.

14 Claims, 5 Drawing Sheets

(56) References Cited

U.S. PATENT DOCUMENTS

2015/0236564 A1    8/2015  Sanada
2018/0031953 A1*  2/2018  Mikami ................. G03B 19/12

* cited by examiner

MIRROR DRIVING DEVICE OF IMAGING APPARATUS AND METHOD FOR CONTROLLING DRIVING OF MIRROR OF IMAGING APPARATUS

CROSS-REFERENCE TO RELATED APPLICATIONS

This patent application is based on and claims priority pursuant to 35 U.S.C. § 119(a) to Japanese Patent Application No. 2019-052672, filed on Mar. 20, 2019, in the Japan Patent Office, the entire disclosure of which is incorporated by reference herein.

BACKGROUND

Technical Field

The present disclosure relates to a mirror driving device of an imaging apparatus and a method for controlling driving of a mirror of an imaging apparatus.

Related Art

A single-lens reflex camera incorporates a quick-return mirror mechanism. The quick-return mirror mechanism includes a movable mirror that is rotatable upward and downward between a viewing position (down position) at which the movable mirror is inserted into a shooting optical path to reflect object light to a viewfinder optical system and a retracted position (up position) at which the movable mirror is retracted from the shooting optical path and allows object light to propagate toward a shutter. A single-lens reflex camera that uses a phase-difference autofocus (AF) sensor to determine an in-focus state includes, as a movable mirror, a main mirror for guiding light to a viewfinder and a sub-mirror that moves in association with the main mirror. The sub-mirror reflects a portion of object light toward the AF sensor. The sub-mirror is supported to be rotatable relative to the main mirror. When the main mirror is at the viewing position, the sub-mirror protrudes into the optical path to guide light to the AF sensor. When the main mirror is at the retracted position, the sub-mirror is also retracted from the optical path.

When the movable mirror is rotated, the movable mirror may be vibrated (bounced) due to a shock of the rotation. The mirror shock may cause an image blur and interrupt an increase in the speed of consecutive shooting. It is demanded to suppress a vibration. For example, when the main mirror is rotated to the viewing position and the sub-mirror is vibrated, ranging is not able to be performed until the sub-mirror has been stopped. It is demanded to quickly settle down the vibration of the sub-mirror in a mirror down state to increase the speed of consecutive shooting.

BRIEF SUMMARY

According to one aspect of the present disclosure, a mirror driving device of an imaging apparatus is configured to move a movable mirror to a first position and a second position. The first position corresponds to one of a viewing state to guide object light to a viewfinder optical system and a shooting state to guide object light to an imaging light-receiving medium. The second position corresponds to the other one of the viewing state and the shooting state. The mirror driving device includes a positioner provided in the imaging apparatus; a mirror holder configured to hold the movable mirror and move to the first position and the second position of the movable mirror; a positioning surface provided at the mirror holder and configured to come into contact with the positioner to determine the first position of the movable mirror; and a shock dispersion surface provided at the mirror holder and, when the movable mirror moves from the second position toward the first position, configured to come into contact with the positioner before the positioning surface comes into contact with the positioner to reduce a shock. The shock dispersion surface has a smaller inclination with respect to a travel-direction tangent line, which is tangent to a travel direction in which the movable mirror moves from the second position to the first position, than an inclination of the positioning surface with respect to the tangent line. The shock dispersion surface is located forward of the positioning surface in the travel direction toward the first position.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
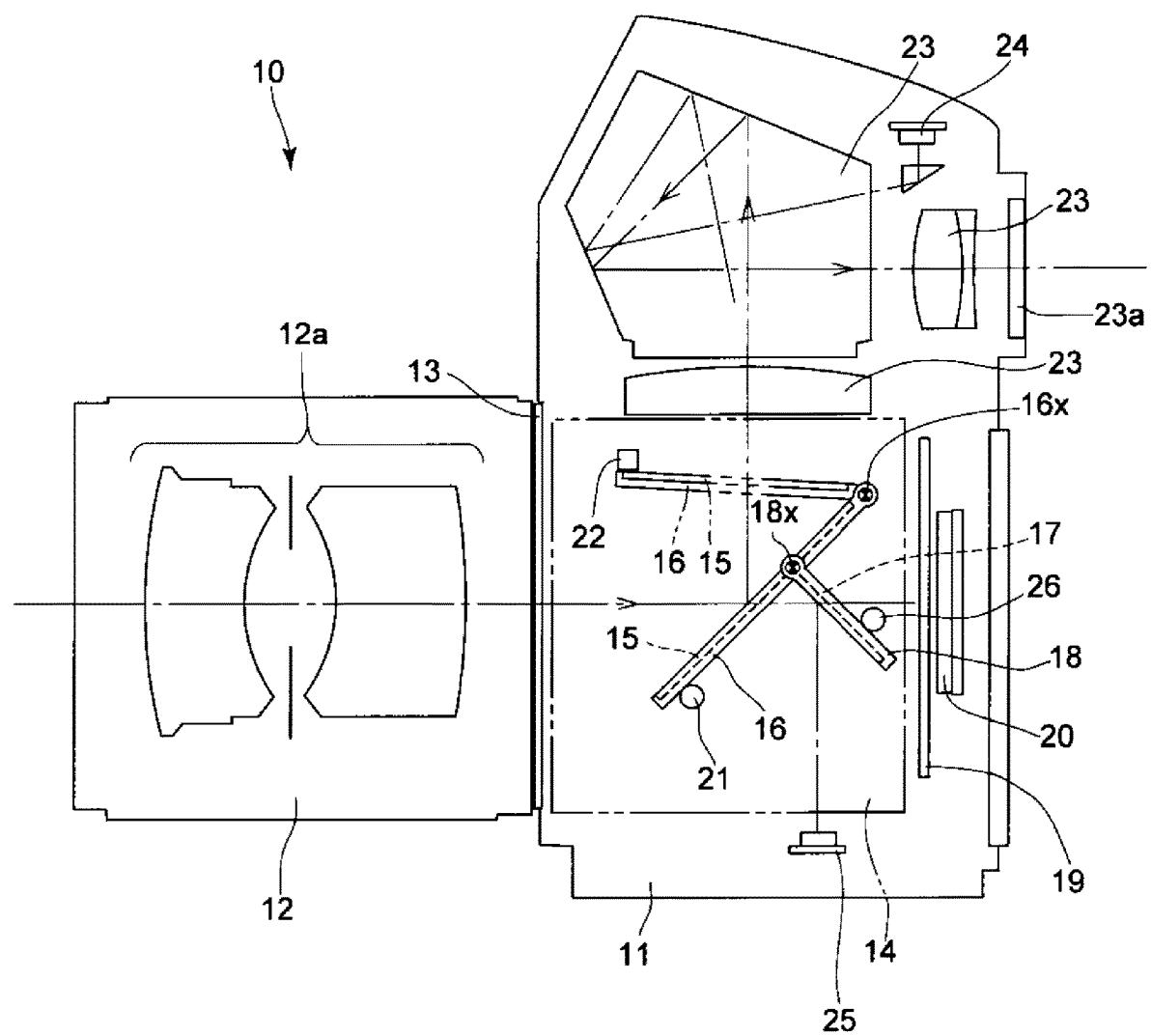
FIG. 1 schematically illustrates an optical system of a single-lens reflex camera.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

An embodiment to which the present disclosure is applied is described below referring to the drawings. FIG. 1 schematically illustrates an optical system of a single-lens reflex camera (hereinafter, referred to as camera) 10 which is an imaging apparatus. A lens mount 13 is provided on a front surface of a camera body 11 constituting a main body portion of the camera 10. An interchangeable lens barrel 12 is attached to and detached from the lens mount 13. A mirror box 14 is provided in a portion of the camera body 11 located in rear of the lens mount 13.

A main mirror 15 and a sub-mirror (movable mirror) 17 constituting a quick-return mirror are provided in the mirror box 14. The main mirror 15 is supported on a main-mirror holding frame 16. The main-mirror holding frame 16 is rotatably supported between both side walls of the mirror box 14 via a main-mirror support shaft 16x. Moreover, the main-mirror holding frame 16 rotatably supports a sub-mirror holding frame (mirror holder) 18 via a sub-mirror support shaft 18x that is substantially parallel to the main-mirror support shaft 16x. The sub-mirror holding frame 18 holds the sub-mirror 17.

A focal plane shutter (hereinafter, referred to as shutter) 19 is provided in rear of the mirror box 14. An image sensor 20 as an imaging light-receiving medium is provided in rear of the shutter 19. The camera 10 according to the embodiment is a digital camera that uses the image sensor 20 for the imaging light-receiving medium. The disclosure is applicable also to a camera that uses a silver-salt film as an imaging light-receiving medium.

The main mirror 15 (main-mirror holding frame 16) is rotated (swung) in a reciprocating manner between a viewing position (a position indicated by a solid line in FIG. 1, and illustrated in FIGS. 2 and 6) and a retracted position (a position indicated by a two-dot chain line in FIG. 1, and illustrated in FIG. 3) about the main-mirror support shaft 16x. At the viewing position, the main mirror 15 is provided in a shooting optical path that extends from an imaging lens 12a in the lens barrel 12 to the image sensor 20 and inclined at an angle of about 45 degrees. At the retracted position, the main mirror 15 is retracted upward from the shooting optical path. A positioning pin 21 (see FIG. 2) protrudes from an inner surface of at least one of both the side walls of the mirror box 14. A stopper 34 of the main-mirror holding frame 16 is brought into contact with the positioning pin 21 to determine a down position of the main mirror 15. The positioning pin 21 is constituted as a rotation-adjustable eccentric pin. The rotation-angle position of the positioning pin 21 is changed to change a contact relationship with respect to the stopper 34, thereby adjusting the angle of the viewing position of the main mirror 15. The positioning pin 21 may be provided on each of both sides in the width direction (right and left directions) of the main-mirror holding frame 16, or may be provided on one of both sides. Moreover, a shock absorbing member 22 is provided in the mirror box 14. The stopper 34 of the main-mirror holding frame 16 comes into contact with the shock absorbing member 22 when the main mirror 15 is rotated to the retracted position. Furthermore, a viewfinder optical system 23 including a pentaprism, an eyepiece lens, and so forth, is provided above the mirror box 14.

When the lens barrel 12 is attached to the lens mount 13 and the main mirror 15 is at the viewing position, object light that enters the mirror box 14 through the imaging lens 12a in the lens barrel 12 is reflected by the main mirror 15 and enters the viewfinder optical system 23. Thus, an object image can be viewed through a viewfinder window 23a that is located on a side of a rear surface of the camera body 11. In this state, a photometry unit 24 provided in rear of the pentaprism included in the viewfinder optical system 23 can measure light.

When the main mirror 15 is at the viewing position, the sub-mirror 17 (sub-mirror holding frame 18) protrudes obliquely downward with respect to the main mirror 15. A portion of object light transmitted through the main mirror 15 that is constituted as a half mirror is reflected by the sub-mirror 17, and is guided to a ranging unit 25 provided below the mirror box 14. Thus, an object distance (in-focus state) can be detected. The ranging unit 25 is a known phase-difference AF sensor. The position in a state of guiding light to the ranging unit 25 is referred to as a protruding position (FIGS. 2 and 6) of the sub-mirror 17 (sub-mirror holding frame 18).

Figure 8:
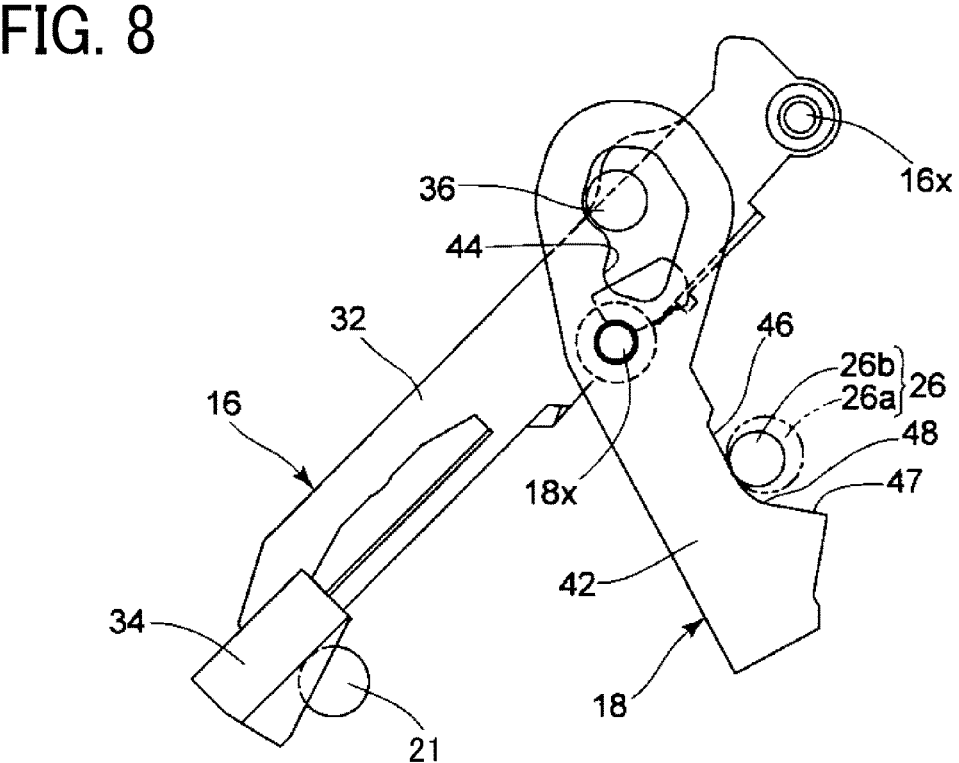
FIG. 8 is a side view of the mirror driving device, the figure illustrating positional adjustment of a sub-mirror in the mirror down state.
Figure 9:
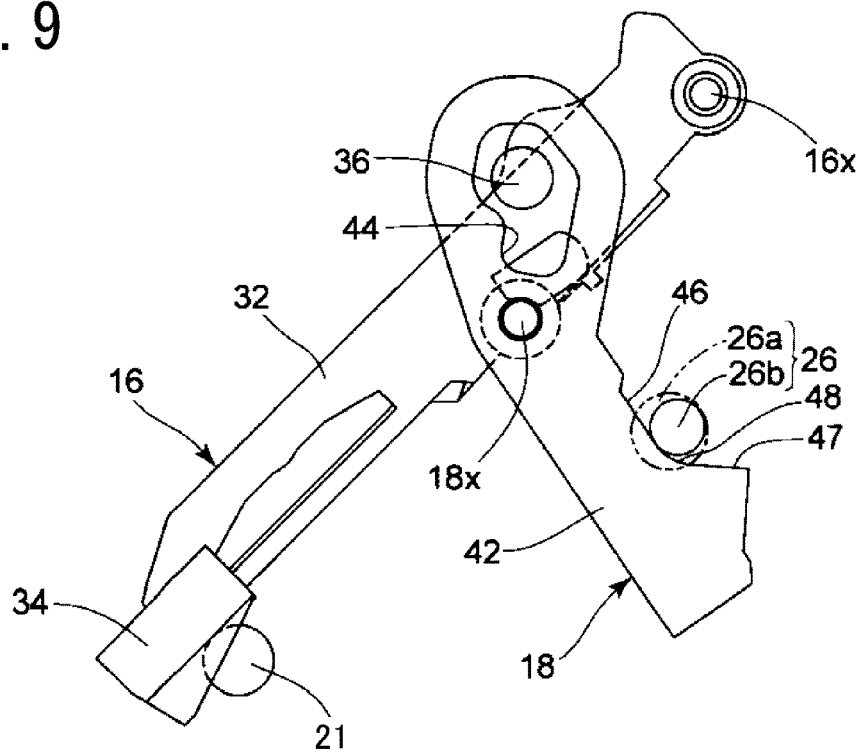
FIG. 9 is a side view of the mirror driving device, the figure illustrating the positional adjustment of the sub-mirror in the mirror down state.

A positioning surface 46 that is provided at the sub-mirror holding frame 18 is brought into contact with a positioning pin (positioner) 26 that is provided at an inner surface of the mirror box 14 to determine the protruding position of the sub-mirror 17. In the embodiment, the positioning pin 26 and the positioning surface 46 are provided on each of both sides in the width direction (right and left directions) of the sub-mirror holding frame 18 (see FIG. 2). Each positioning pin 26 is constituted as an eccentric pin having a base portion 26a and a tip end portion 26b the center position of which is eccentric from the center position of the base portion 26a. Rotating the positioning pin 26 about the axis of the base portion 26a changes the position of the tip end portion 26b eccentric from the base portion 26a. With the change in position of the tip end portion 26b, the angle of the protruding position of the sub-mirror holding frame 18 can be adjusted. FIG. 8 illustrates a protruding position of the sub-mirror holding frame 18 when the protruding position is set to a side closest to a stored position (in a clockwise direction centered at the sub-mirror support shaft 18x). FIG. 9 illustrates a protruding position of the sub-mirror holding frame 18 when the protruding position is set to a side farthest from the stored position (in a counterclockwise direction centered at the sub-mirror support shaft 18x).

Figure 3:
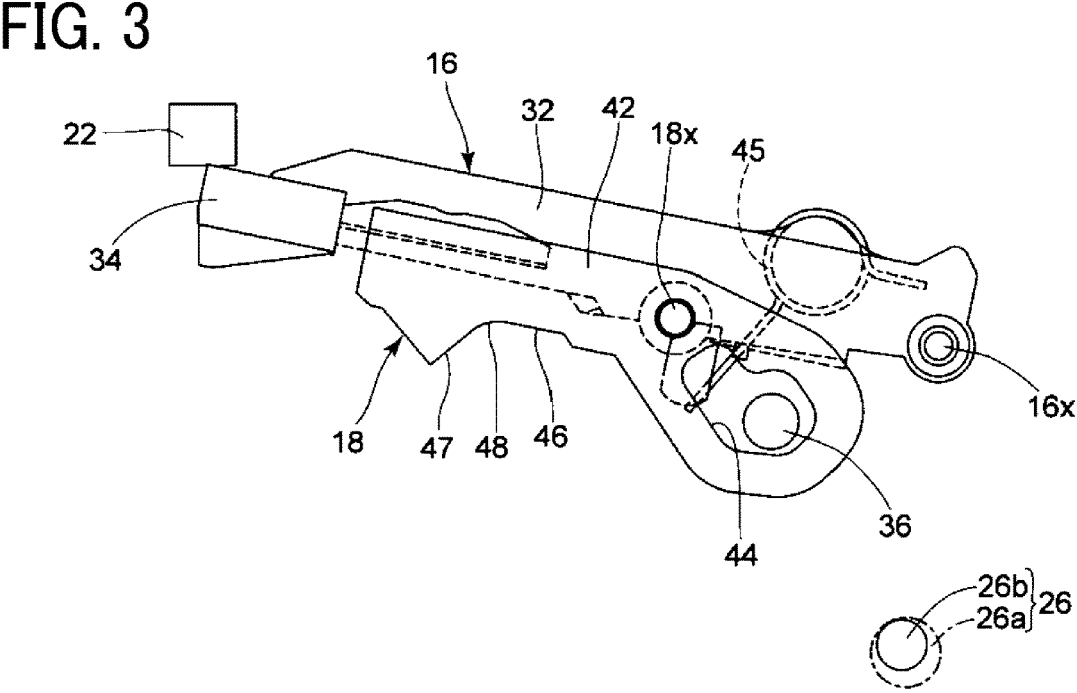
FIG. 3 is a side view of the mirror driving device in a mirror up state.
Figure 3:
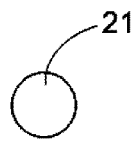

When the main mirror 15 is at the retracted position (FIG. 3), the object light that enters the mirror box 14 through the imaging lens 12a is not reflected by the main mirror 15 and propagates toward the shutter 19. Opening the shutter 19 allows the light to be incident on the light-receiving surface of the image sensor 20. When the main mirror 15 is at the retracted position, the sub-mirror 17 is stored on a side of a rear surface of the main-mirror holding frame 16 and does not protrude into the optical path. The position of the sub-mirror 17 (sub-mirror holding frame 18) is referred to as a stored position (FIG. 3).

Figure 2:
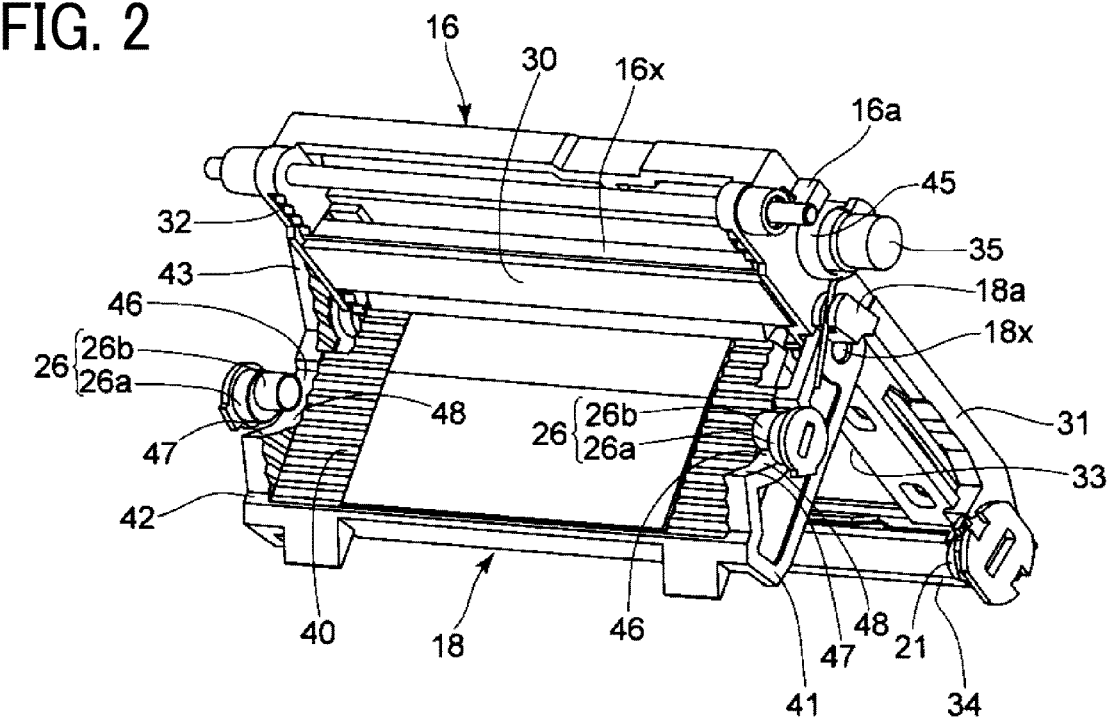
FIG. 2 is a perspective view of a mirror driving device in a mirror down state.

Specific support structures of the main mirror 15 and the sub-mirror 17 are described. As illustrated in FIG. 2, the main-mirror holding frame 16 has a pair of side walls 31 and 32 on both sides of a mirror support surface 30 that supports the main mirror 15. A light-transmissive opening 33 is formed between the pair of side walls 31 and 32 to transmit a portion of object light toward the sub-mirror 17. The main-mirror support shaft 16x provided in the mirror box 14 is inserted into shaft holes provided near rear ends of the side walls 31 and 32. The stopper 34 is formed near a front end of the main-mirror holding frame 16. A mirror driving boss 35 is provided at a portion of the side wall 31 near the main-mirror support shaft 16x. The sub-mirror support shaft 18 is provided at a position in the middle in the longitudinal direction of the side walls 31 and 32. The sub-mirror support shaft 18x protrudes to lateral sides and has an axis parallel to the axis of the main-mirror support shaft 16x.

The sub-mirror holding frame 18 has a pair of side walls 41 and 42 on both sides of a mirror support surface 40 that supports the sub-mirror 17. The side walls 41 and 42 are positioned to sandwich the side walls 31 and 32 of the main-mirror holding frame 16. The side walls 41 and 42 have respective shaft holes into which the sub-mirror support shaft 18x is inserted. The side wall 42 is integrally formed with an extension arm 43. The extension arm 43 extends in a direction different from the longitudinal direction of the side wall 42 with respect to the rotatable support position by the sub-mirror support shaft 18x. The extension arm 43 has a cam hole 44. A sub-mirror position control pin 36 is inserted into the cam hole 44. The sub-mirror position control pin 36 is a secured portion protruding inward of the mirror box 14.

The sub-mirror holding frame 18 is rotatable relative to the main-mirror holding frame 16 about the sub-mirror support shaft 18x. When the main-mirror holding frame 16 rotates, the cam hole 44 and the sub-mirror position control pin 36 control the angle of the sub-mirror holding frame 18 with respect to the main-mirror holding frame 16.

An urging spring 45 is hooked to the main-mirror holding frame 16 and the sub-mirror holding frame 18. The urging spring 45 is a torsion spring. The urging spring 45 has a coil portion surrounding the mirror driving boss 35 and a pair of spring end portions protruding from the coil portion. One of the spring end portions of the urging spring 45 engages with a spring hook 16a of the main-mirror holding frame 16. The other one of the spring end portions of the urging spring 45 engages with a spring hook 18a of the sub-mirror holding frame 18 (see FIG. 2). The urging spring 45 urges the rotation of the sub-mirror holding frame 18 relative to the main-mirror holding frame 16. The urging direction is inverted in accordance with the position of the main-mirror holding frame 16. The urging direction of the sub-mirror holding frame 18 by the urging spring 45 is described later in the description on the operation of the sub-mirror holding frame 18.

A mirror driving mechanism that rotates the main mirror 15 upward and downward is provided on one side portion of the mirror box 14. The mirror driving mechanism is not illustrated and its detailed description is omitted. In this case, a known mechanism may be used. An example mechanism may include a mirror driving lever that is rotatably supported by the mirror box 14 via a support shaft parallel to the main-mirror support shaft 16x. The mirror driving lever is rotated (swung) by a driving force of a motor. The mirror driving lever can transmit the force to the mirror driving boss 35 provided at the side portion of the main-mirror holding frame 16. The mirror driving lever presses the mirror driving boss 35 downward to rotate the main mirror 15 toward the viewing position. The mirror driving lever presses the mirror driving boss 35 upward to rotate the main mirror 15 toward the retracted position.

Figure 7:
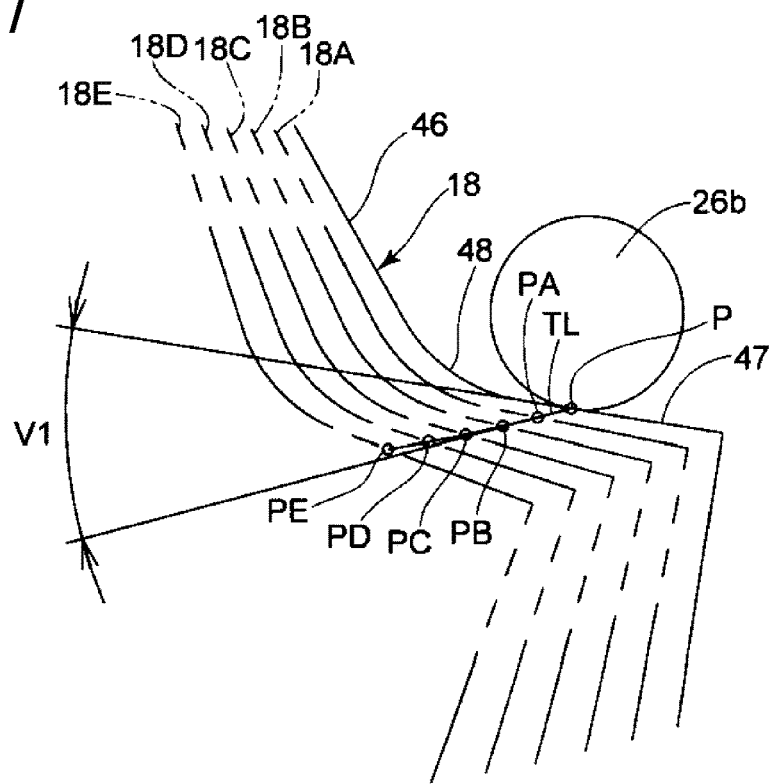
FIG. 7 is a side view illustrating a relationship between a shock dispersion surface of a sub-mirror holding frame and a positioning pin.

The camera 10 according to the embodiment has a structure for vibration reduction (shock absorption) of the sub-mirror 17 (sub-mirror holding frame 18) when the sub-mirror 17 is rotated from the stored position to the protruding position by the rotation of the main mirror 15 from the retracted position to the viewing position. In the description on mirror-vibration reduction given below, a moving direction of the sub-mirror 17 is referred to as a travel direction. In particular, a moving direction of the sub-mirror 17 from the stored position to the protruding position when the main mirror 15 rotates from the retracted position to the viewing position is referred to as forward in the travel direction. The sub-mirror 17 moves along a trajectory having a combination of a change in position of the sub-mirror support shaft 18x in the rotation direction about the main-mirror support shaft 16x and a rotation of the sub-mirror holding frame 18 about the sub-mirror support shaft 18x. That is, the travel direction of the sub-mirror 17 is a direction in which the sub-mirror 17 rotates while changing the axis position (sub-mirror support shaft 18x). A travel-direction tangent line TL illustrated in FIG. 7 is a straight line that connects specific positions (contact points P, described later) on the sub-mirror holding frame 18 to one another when the main mirror 15 rotates per predetermined angle toward the viewing position.

Each of the side walls 41 and 42 of the sub-mirror holding frame 18 has the positioning surface 46 and a shock dispersion surface 47. The positioning surface 46 and the shock dispersion surface 47 are formed at an edge portion of each of the side walls 41 and 42 located forward in the travel direction. A connection surface 48 is formed between the positioning surface 46 and the shock dispersion surface 47. The connection surface 48 is a recessed and curved surface.

In the mirror down state, when a direction connecting a point at which the sub-mirror holding frame 18 is in contact with the positioning pin 26 and the center of the sub-mirror support shaft 18x serves as a radius of gyration of the sub-mirror holding frame 18, the positioning surface 46 is a surface at an angle close to the radius of gyration. The shock dispersion surface 47 is a surface having a larger crossing angle with respect to the radius of gyration of the sub-mirror holding frame 18 than that of the positioning surface 46. More specifically, the shock dispersion surface 47 is a surface that is located forward of the positioning surface 46 in the travel direction, and the protruding amount of which toward the outer side of the radius of gyration (toward the outer diameter) of the sub-mirror holding frame 18 increases as the shock dispersion surface 47 travels forward in the travel direction (in a direction away from the positioning surface 46). The shock dispersion surface 47 has a smaller inclination with respect to the travel-direction tangent line TL than that of the positioning surface 46.

Figure 4:
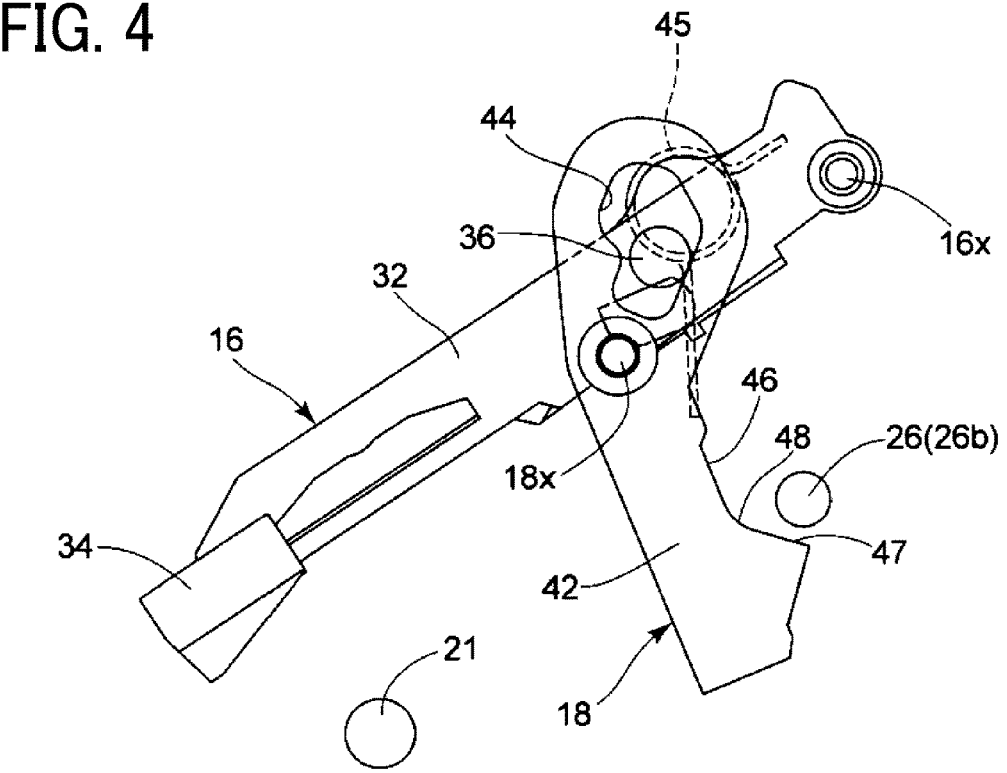
FIG. 4 is a side view of the mirror driving device in a transition from the mirror up state to the mirror down state.
Figure 5:
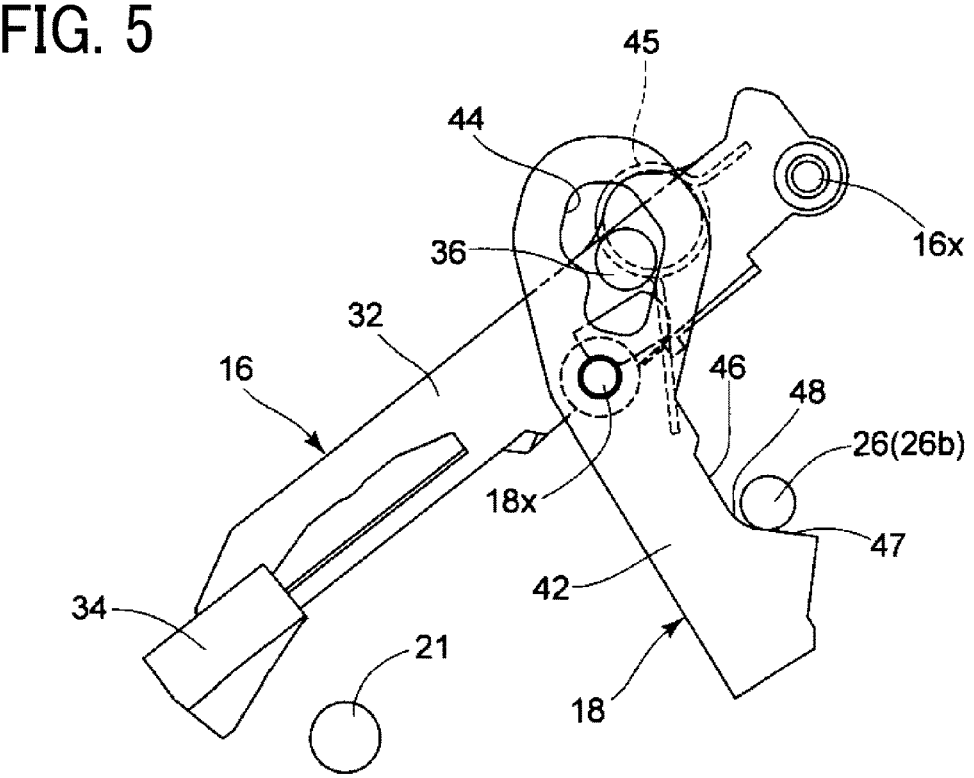
FIG. 5 is a side view of the mirror driving device in the transition from the mirror up state to the mirror down state.
Figure 6:
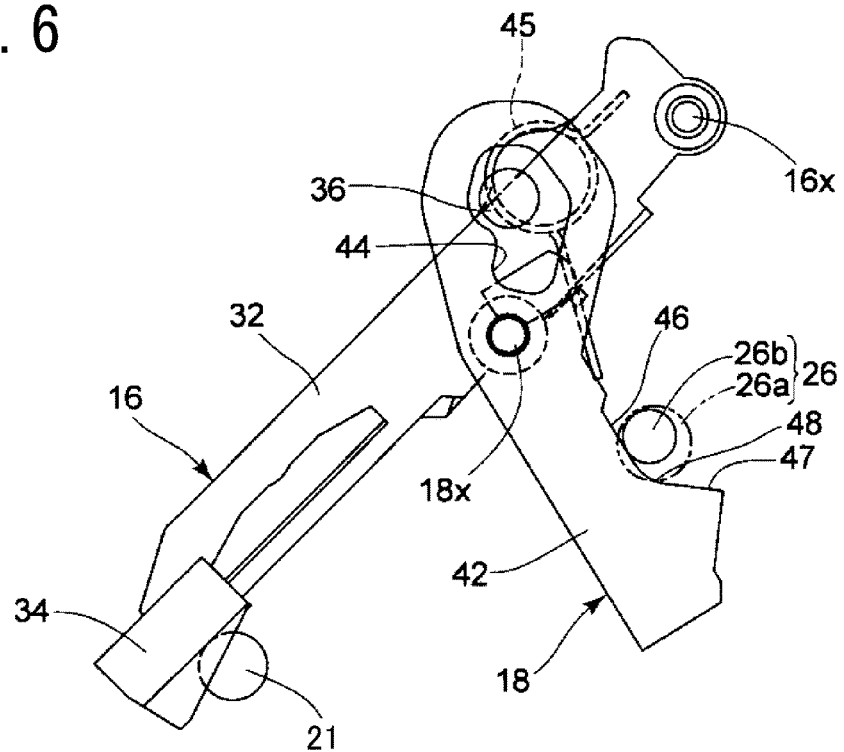
FIG. 6 is a side view of the mirror driving device in the mirror down state.

The operation of the mirror driving device having the above-described structure is described. FIG. 3 illustrates the mirror up state (shooting state) in which the main mirror 15 (main-mirror holding frame 16) is at the retracted position and the sub-mirror 17 (sub-mirror holding frame 18) is at the stored position. FIG. 6 illustrates the mirror down state (viewing state) in which the main mirror 15 (main-mirror holding frame 16) is at the viewing position and the sub-mirror 17 (sub-mirror holding frame 18) is at the protruding position. FIGS. 4 and 5 illustrate the mirror driving device in a transition from the mirror up state to the mirror down state.

The stopper 34 is in contact with the shock absorbing member 22 in the mirror box 14 from below when the main-mirror holding frame 16 is at the retracted position in FIG. 3. At this time, the urging spring 45 urges the sub-mirror holding frame 18 toward the stored position, and hence the sub-mirror holding frame 18 is held at the stored position.

When the main-mirror holding frame 16 rotates from the retracted position to the viewing position, the position of the sub-mirror support shaft 18x that rotatably supports the sub-mirror holding frame 18 changes downward accordingly along an arcuate trajectory centered at the main-mirror support shaft 16x. Moreover, when the main-mirror holding frame 16 rotates from the retracted position to the viewing position, the sub-mirror position control pin 36 presses the inner surface of the cam hole 44, and hence the sub-mirror holding frame 18 rotates (in the counterclockwise direction) from the retracted position to the protruding position against the urging force of the urging spring 45.

When the main-mirror holding frame 16 rotates toward the viewing position by a predetermined amount and hence the opening angle of the sub-mirror holding frame 18 with respect to the main-mirror holding frame 16 becomes a predetermined angle or more, the urging direction of the sub-mirror holding frame 18 by the urging spring 45 is inverted. At this time and later, the urging spring 45 urges the sub-mirror holding frame 18 toward the protruding position.

As the main-mirror holding frame 16 continues rotating toward the viewing position and the mirror down operation is almost completed, the side walls 41 and 42 of the sub-mirror holding frame 18 each approach the corresponding positioning pin 26 as illustrated in FIG. 4. Then, the shock dispersion surface 47 formed at each of the side walls 41 and 42 comes into contact with the tip end portion 26b of the corresponding positioning pin 26 as illustrated in FIG. 5.

The position of the sub-mirror holding frame 18 indicated by a solid line in FIG. 7 indicates an angular position (contact start position) in an instance when the shock dispersion surface 47 starts coming into contact with the positioning pin 26. At this time, a position of the shock dispersion surface 47 that comes into contact (point contact) with the positioning pin 26 is referred to as a contact point P on the shock dispersion surface 47. Positions (18A to 18E) of the sub-mirror holding frame 18 indicated by two-dot chain lines in FIG. 7 indicate angular positions of the sub-mirror holding frame 18 before reaching the contact start position per a rotation angle of 1° of the main-mirror holding frame 16 with reference to the contact start position. The positions in transition of the contact point P at the angular positions 18A to 18E of the sub-mirror holding frame 18 are respectively indicated by PA to PE. For example, a straight line connecting the contact point PA and the contact point P is a travel-direction tangent line TL when the sub-mirror holding frame 18 moves from the angular position 18A to the contact start position.

The shock dispersion surface 47 is a surface that has a smaller inclination with respect to the travel-direction tangent line TL of the sub-mirror holding frame 18 than that of the positioning surface 46. Thus, when the shock dispersion surface 47 comes into contact with the positioning pin 26 (tip end portion 26b), the shock dispersion surface 47 disperses the contact energy to reduce a force of the sub-mirror holding frame 18 jumping up toward the stored position due to a shock, thereby efficiently reducing a bound of the sub-mirror holding frame 18. In the embodiment, an angle V1 (FIG. 7) between the travel-direction tangent line TL and the shock dispersion surface 47 is set at about 25°. Decreasing the angle V1 increases a shock dispersion effect. However, decreasing the angle V1 increases the required length of the shock dispersion surface 47, and a space is required. A proper value of the angle V1 is determined in consideration of such various conditions. For example, when the angle V1 is set to 45° or less, the space can be saved and a component force that reduces a bound of the sub-mirror holding frame 18 when the sub-mirror holding frame 18 comes into contact with the positioning pin 26 is likely generated.

When the main-mirror holding frame 16 further rotates toward the viewing position, the contact position of the positioning pin 26 with respect to the sub-mirror holding frame 18 changes from the shock dispersion surface 47 toward the positioning surface 46. Since the curved and recessed connection surface 48 is formed between the shock dispersion surface 47 and the positioning surface 46, even when the sub-mirror holding frame 18 travels while the positioning pin 26 slides from the shock dispersion surface 47 to the connection surface 48, the sub-mirror holding frame 18 can be smoothly operated without being caught.

When the main-mirror holding frame 16 has reached the viewing position, as illustrated in FIG. 6, the stopper 34 comes into contact with the positioning pin 21, and the main-mirror holding frame 16 stops in a state positioned at the viewing position. Moreover, the positioning surface 46 comes into contact with the positioning pin 26, and the sub-mirror holding frame 18 stops in a state positioned at the protruding position. In this state, a clearance is provided between the sub-mirror position control pin 36 and the inner surface of the cam hole 44. The position of the sub-mirror holding frame 18 is controlled by the contact between the positioning pin 26 and the positioning surface 46.

The positioning surface 46 is a surface that has a larger inclination with respect to the travel-direction tangent line TL of the sub-mirror holding frame 18 than that of the shock dispersion surface 47, and that extends at an angle close to the radius of gyration of the sub-mirror holding frame 18. The contact of the positioning surface 46 with the positioning pin 26 can reliably determine the protruding position of the sub-mirror holding frame 18. The sub-mirror holding frame 18 is stable in a state in which the positioning surface 46 is pressed against the positioning pin 26 by the urging force of the urging spring 45.

As described above, rotating the positioning pin 26 about the base portion 26a changes the position of the tip end portion 26b eccentric from the base portion 26a to adjust the angle of the protruding position of the sub-mirror holding frame 18 (see FIGS. 8 and 9).

The shock dispersion surface 47 of the sub-mirror holding frame 18 has a preset length (a protruding amount from the positioning surface 46) so that the shock dispersion surface 47 can come into contact with the tip end portion 26b during a mirror down operation irrespective of the position of the positioning pin 26 in the rotation direction.

As described above, in the camera 10 according to the embodiment, the sub-mirror holding frame 18 has the positioning surface 46 and the shock dispersion surface 47, and the positioning surface 46 comes into contact with the positioning pin 26. Thus, the position (protruding position) of the sub-mirror holding frame 18 in the mirror down state is determined. Before the sub-mirror holding frame 18 has reached the protruding position, the shock dispersion surface 47 comes into contact with the positioning pin 26. Thus, vibration reduction (shock absorption) is performed during mirror down. The shock dispersion surface 47 has a smaller inclination with respect to the travel direction (travel-direction tangent line TL) of the sub-mirror holding frame 18 during mirror down than that of the positioning surface 46. Thus, the effect of vibration reduction for the sub-mirror holding frame 18 when the shock dispersion surface 47 comes into contact with the positioning pin 26 is enhanced.

The shock dispersion surface 47 is used to reduce a vibration of the sub-mirror holding frame 18 during mirror down and to stop the sub-mirror holding frame 18 at the protruding position quickly and reliably. Thus, the time required until the ranging unit 25 performs ranging can be reduced, and continuous shooting (consecutive shooting) performance of the camera 10 can be increased. Moreover, the vibration that is transmitted from the sub-mirror holding frame 18 to the main-mirror holding frame 16 is settled down early. Thus, in the mirror down state, the timing at which an object image can be viewed with the viewfinder optical system 23 and the timing at which the photometry unit 24 can measure light are not delayed.

The shock dispersion surface 47 has a simple configuration in which portions of the side walls 41 and 42 of the sub-mirror holding frame 18 protrude toward the rear surface. Thus, the simple configuration can be obtained without an increase in the number of parts. Moreover, the shock dispersion surface 47 is integrally formed with the sub-mirror holding frame 18 together with the positioning surface 46. Thus, precision of a contact with respect to the positioning pin 26 can be easily controlled. Furthermore, the shock dispersion surface 47 is provided at each of both the side walls 41 and 42. Thus, when the shock dispersion surface 47 comes into contact with the positioning pin 26, the sub-mirror holding frame 18 is less likely rattled or twisted, and the vibration of the sub-mirror holding frame 18 can be reliably reduced.

Although the embodiment of the present disclosure has been described above, the present disclosure is not limited to such a specific embodiment, and various modifications and changes can be made without departing from the spirit and scope of the disclosure.

While the disclosure is applied to vibration reduction of the sub-mirror 17 in the above-described embodiment, the disclosure can be applied to vibration reduction of the main mirror 15. In this case, the main-mirror holding frame 16 is rotatably supported via another support member that is movable (rotatable) relative to the mirror box 14. When operated to the mirror up state and the mirror down state, the main-mirror holding frame 16 is rotated while the position of the main-mirror support shaft 16x is changed. A shock dispersion surface corresponding to the shock dispersion surface 47 is provided at the main-mirror holding frame 16, so that the shock dispersion surface of the main-mirror holding frame 16 comes into contact with the positioning pin 21 before the stopper 34 comes into contact with the positioning pin 21.

While the disclosure is applied to mirror vibration reduction during mirror down in the above-described embodiment, the disclosure can be applied to mirror vibration reduction during mirror up. Specifically, the disclosure can be applied to vibration reduction when the main mirror is rotated to the retracted position and when the sub-mirror is rotated to the stored position.

While the shock dispersion surface 47 is a surface that extends straight in the above-described embodiment, a shock dispersion surface may be a curved surface.

While the positioning pin 26 of the above-described embodiment can adjust the position of the tip end portion 26b, a positioner provided in an imaging apparatus may be a secured portion the position of which is not changed.

While the positioning pin 26, the positioning surface 46, the shock dispersion surface 47, and the connection surface 48 are provided on each of both sides in the width direction (right and left directions) of the sub-mirror holding frame 18 in the above-described embodiment, the elements may be provided on one side in the width direction (right and left directions) of the sub-mirror holding frame 18.

In the above-described embodiment, the main-mirror holding frame 16 is rotatably supported by the main-mirror support shaft 16x, the sub-mirror holding frame 18 is rotatably supported by the sub-mirror support shaft 18x, and the main-mirror holding frame 16 and the sub-mirror holding frame 18 are rotated around their respective axes. However, the disclosure can be applied to an imaging apparatus that operates a movable mirror in a way different from the way of the above-described embodiment. For example, an imaging apparatus in which a mirror holder that holds a movable mirror is operated by a voice coil motor or the like along a desirable trajectory may be employed. That is, the disclosure can be widely applied to any one of various configurations as far as the configuration utilizes an embodiment of driving a mirror with an advantageous effect obtained by a shock dispersion surface.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A mirror driving device of an imaging apparatus, the mirror driving device being configured to move a movable mirror to a first position and a second position, the first position corresponding to one of a viewing state to guide object light to a viewfinder optical system and a shooting state to guide object light to an imaging light-receiving medium, the second position corresponding to the other one of the viewing state and the shooting state, the mirror driving device comprising:
   a positioner provided in the imaging apparatus;
   a mirror holder to hold the movable mirror and move the movable mirror to the first position and the second position;
   a positioning surface provided as part of the mirror holder to come into contact with the positioner to determine the first position of the movable mirror; and
   a shock dispersion surface provided as part of the mirror holder that, when the movable mirror moves from the second position toward the first position, comes into contact with the positioner before the positioning surface comes into contact with the positioner to reduce a shock,
   wherein the shock dispersion surface has a smaller inclination with respect to a travel-direction tangent line, which is tangent to a travel direction in which the movable mirror moves from the second position to the first position, than an inclination of the positioning surface with respect to the tangent line,
   wherein the shock dispersion surface is located forward of the positioning surface in the travel direction toward the first position,
   wherein the movable mirror includes a sub-mirror and the mirror holder includes a sub-mirror holding frame to hold the sub-mirror, the sub-mirror holding frame, together with the sub-mirror, being rotatable about a sub-mirror support shaft between the first position and the second position, and
   wherein in a side view the positioning surface is located, in the travel direction, forward of a plane that extends through a center of the sub-mirror support shaft and that is parallel to a reflecting face of the sub-mirror.

2. The mirror driving device of the imaging apparatus according to claim 1, wherein the positioning surface and the shock dispersion surface are connected to each other by a recessed and curved surface.

3. The mirror driving device of the imaging apparatus according to claim 1, further comprising:
an urging portion that urges the mirror holder in a direction in which the urging portion presses the positioning surface against the positioner when the movable mirror is at the first position.

4. The mirror driving device of the imaging apparatus according to claim 1, further comprising:
a main mirror rotatable between a viewing position located in a shooting optical path to reflect object light to the viewfinder optical system and a retracted position retracted from the shooting optical path to allow object light to propagate toward the imaging light-receiving medium,
wherein the sub-mirror, which is supported rotatably relative to the main mirror, is located at a protruding position to reflect a portion of object light in a direction different from a direction to the viewfinder optical system when the main mirror is at the viewing position, and is located at a stored position retracted from the shooting optical path together with the main mirror when the main mirror is at the retracted position,
wherein the mirror holder is the sub-mirror holding frame, the sub-mirror holding frame being rotatably supported by a main-mirror holding frame that holds the main mirror, and
wherein the first position is the protruding position of the sub-mirror, and the second position is the stored position of the sub-mirror.

5. The mirror driving device of the imaging apparatus according to claim 4,
wherein the sub-mirror holding frame has a side wall on each of both sides of a support surface to support the sub-mirror, and
wherein the positioning surface and the shock dispersion surface are formed at an edge portion of at least one of the side walls.

6. The mirror driving device of the imaging apparatus according to claim 1, wherein all of the shock dispersion surface is located, in the travel direction, forward of the plane that extends through the center of the sub-mirror support shaft and that is parallel to the reflecting face of the sub-mirror.

7. The mirror driving device of the imaging apparatus according to claim 1, wherein the plane is parallel to the positioning surface.

8. The mirror driving device of the imaging apparatus according to claim 1,
wherein the positioner includes an eccentric pin having a base portion and a tip end portion with a first center position eccentric from a second center portion of the base portion, and
wherein the tip end portion contacts the shock dispersion surface and the positioning surface as the movable mirror moves from the second position toward the first position.

9. The mirror driving device of the imaging apparatus according to claim 8, wherein a first radius of the base portion is greater than a second radius of the tip end portion of the eccentric pin.

10. A method for controlling driving of a mirror of an imaging apparatus using a mirror driving device, the mirror driving device being configured to move a movable mirror to a first position and a second position, the first position corresponding to one of a viewing state to guide object light to a viewfinder optical system and a shooting state to guide object light to an imaging light-receiving medium, the second position corresponding to the other one of the viewing state and the shooting state, the method comprising:
providing a positioner in the imaging apparatus;
providing a mirror holder to hold the movable mirror and move the movable mirror to the first position and the second position;
providing, as part of the mirror holder, a positioning surface to come into contact with the positioner to determine the first position of the movable mirror;
providing a shock dispersion surface, as part of the mirror holder, the shock dispersion surface having a smaller inclination with respect to a travel-direction tangent line, which is tangent to a travel direction in which the movable mirror moves from the second position to the first position, than an inclination of the positioning surface with respect to the tangent line, the shock dispersion surface being located forward of the positioning surface in the travel direction toward the first position; and
when the movable mirror moves from the second position toward the first position, bringing the shock dispersion surface into contact with the positioner before the positioning surface comes into contact with the positioner to reduce a shock,
wherein the movable mirror includes a sub-mirror and the mirror holder includes a sub-mirror holding frame to hold the sub-mirror,
wherein when the movable mirror moves from the second position toward the first position, the sub-mirror holding frame, together with the sub-mirror, rotates about a sub-mirror support shaft, and
wherein in a side view the positioning surface is located, in the travel direction, forward of a plane that extends through a center of the sub-mirror support shaft and that is parallel to a reflecting face of the sub-mirror.

11. The method according to claim 10, further comprising, when the movable mirror moves from the second position toward the first position, bringing the positioner into contact with the positioning surface after the positioner has made contact with the shock dispersion surface.

12. The method according to claim 10, wherein all of the shock dispersion surface is located, in the travel direction, forward of the plane that extends through the center of the sub-mirror support shaft and that is parallel to the reflecting face of the sub-mirror.

13. The method according to claim 10, wherein the plane is parallel to the positioning surface.

14. The method according to claim 10, wherein
wherein the positioner includes an eccentric pin having a base portion and a tip end portion with a first center position eccentric from a second center portion of the base portion, and
wherein the tip end portion contacts the shock dispersion surface and the positioning surface as the movable mirror moves from the second position toward the first position.

* * * * *